T. D. DAVIS.
Lawn-Rake.

No. 210,924. Patented Dec. 17, 1878.

Attest:
H. M. Fisher
J. J. Allen

Inventor
Theodore D. Davis

UNITED STATES PATENT OFFICE.

THEODORE D. DAVIS, OF SYRACUSE, NEW YORK, ASSIGNOR TO JULIA H. DAVIS, OF SAME PLACE.

IMPROVEMENT IN LAWN-RAKES.

Specification forming part of Letters Patent No. 210,924, dated December 17, 1878; application filed November 15, 1878.

*To all whom it may concern:*

Be it known that I, THEODORE D. DAVIS, of Syracuse, in the county of Onondaga and State of New York, have invented a new and useful Improvement in Rakes designed principally for cleaning lawns, of which the following is a specification:

The invention relates to hand-rakes for raking short grass, leaves, &c., from lawns. Heretofore lawns have been cleaned by hay-rakes, garden-rakes, brooms, &c. These implements are objectionable, for the reason that the teeth catch into and pull out the grass and roots, thereby greatly injuring the grass and disfiguring a lawn. Much time also is required, as a portion of the grass, leaves, &c., pass between the teeth, over the top, and out at the ends, necessitating repetitions of the operation.

A beautiful lawn is secured only by many years of care and labor. The roots of the grass of a fine lawn are very tender and lie very near the surface, and are therefore very easily torn and damaged.

The object of my invention is to provide a rake with teeth of such a form and so arranged and guarded that it will pass over the surface without catching into the grass or roots, and will also retain the substances gathered by it.

The invention consists in a wide thin tapering tooth, the end of which is oval or egg-shaped.

It also consists in guarding or preventing the ends of the teeth from entering the earth.

It also consists in furnishing a hood for partly inclosing the rake and preventing the substances gathered from falling out.

It also consists in the manner of securing the teeth to the head; and, finally, it consists in connecting the handle to the top or back of the head, leaving the interior of the rake without obstruction.

Figure 1:
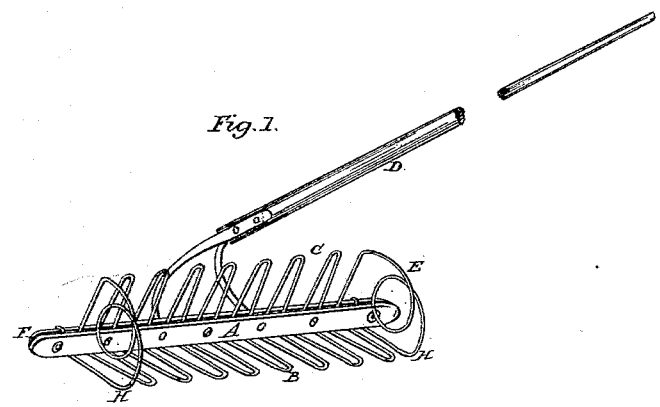
Figure 2:
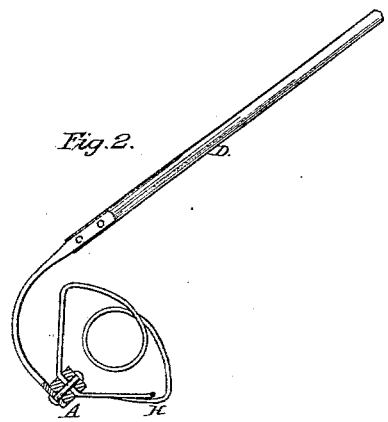

In the accompanying drawing, in which similar letters of reference indicate like parts, Figure 1 is a perspective of the device. Fig. 2 is an end elevation, showing the manner of securing the teeth and the handle, and also the construction and operation of the runner and guard.

A is a head or bar, preferably of wood, to which the teeth B, the hood C, formed by extending the teeth above the head and forward across the ends, and the handle D, are secured. The head A is made in two parts, which may be cylindrical and tapering from the center to the ends, the inner faces of which are grooved to receive the teeth B, which are bent forward at or near the head, which, in connection with the grooves, prevent them from moving or changing their position.

The teeth B, hood C, and ends E are formed from one piece of No. 11 iron or steel wire, or of such other size wire as may be most desirable, which may be galvanized or covered if desired, to prevent injury from rust.

The wire is bent to the desired form and secured by being clamped between the pieces A. These pieces are so constructed that, by regulating the depth of the grooves, when clamped or drawn together by the screws and rivets which secure them, their inner faces will not come quite together, leaving an opening or space, F, for the purpose of securing a full-width bearing of the head against opposite sides of the teeth.

The teeth are made with a taper from the head to near the point, which is oval or egg-shaped, the end of the extension being rounded to prevent injury to the person and to prevent fouling, or catching leaves, &c. The ends E are also used as runners and guards by being extended forward of, below, and beyond the ends of the teeth, as shown at H H, and rounded to the proper form, which prevent the teeth from entering the earth and damaging the roots in whatever position or angle the rake may be held or used, and serve, also, to prevent the substances gathered from falling at the ends of the rake.

The handle is connected to the head by braces passing over the hood and riveted to the head, leaving the interior of the hood and rake without obstruction.

If a hood is desired that will retain smaller substances, it may be made of thin wood, sheet metal, wire-cloth, paper, &c., and attached to the extension of the teeth or head in any suitable manner, in which case all, or nearly all, of the teeth B may be bent or turned over on or near the top of the head.

If it is desired to use the rake in rough places or tangled grass, where greater strength is required, the teeth may be inserted so that their wide or flat sides will stand vertical or at right angles with the head, or they may be incased in metal webs or sheaths.

What I claim is—

1. In combination, the rake-head composed of two or more pieces, the teeth B, and the fastening devices for clamping the teeth and the extensions thereof in the rake-head, and the handle D, extending over the hood, substantially as shown and described.

2. In a hand-rake, a series of teeth formed of a single piece of wire, and constructed as shown and described.

3. In a hand-rake, the end E, serving as a runner and guard, and constructed substantially as shown and described.

4. In a hand-rake, the teeth B and projections or extensions forming hood C, made of a single piece of wire, substantially as shown and described.

5. In a hand-rake, the combination of teeth B, guards and runners E, and hood C, substantially as shown and described.

6. In combination with head A, a wire tooth bent tapering to an oval point, and the extension thereof above the rake-head rounded, as shown and described.

THEODORE D. DAVIS.

Witnesses:
DAVID A. MOORE,
ELBERT O. FARRAR.